United States Patent
Hofacker et al.

(10) Patent No.: US 7,550,527 B2
(45) Date of Patent: Jun. 23, 2009

(54) AQUEOUS COPOLYMER DISPERSIONS WITH REACTIVE DILUENT

(75) Inventors: Steffen Hofacker, Odenthal (DE); Markus Mechtel, Bergisch Gladbach (DE); Thomas Münzmay, Dormagen (DE); Nusret Yuva, Burscheid (DE); Rolf Gertzmann, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/368,928

(22) Filed: Mar. 6, 2006

(65) Prior Publication Data

US 2006/0205857 A1    Sep. 14, 2006

(30) Foreign Application Priority Data

Mar. 9, 2005 (DE) .................. 10 2005 010 694

(51) Int. Cl.
*C08F 283/00* (2006.01)
(52) U.S. Cl. .................. 524/457; 525/468; 526/319; 526/320
(58) Field of Classification Search .................. 524/457; 525/468; 526/319, 320
See application file for complete search history.

(56) References Cited

U.S. PATENT DOCUMENTS

| | | | | |
|---|---|---|---|---|
| 4,423,165 A | 12/1983 | Harper et al. | ............... | 523/409 |
| 4,539,362 A | 9/1985 | Davies et al. | ............... | 524/458 |
| 5,242,716 A * | 9/1993 | Iwase et al. | ............... | 427/407.1 |
| 5,750,613 A | 5/1998 | Blum et al. | ............... | 524/457 |
| 6,309,710 B1 * | 10/2001 | Sapper | ............... | 427/407.1 |
| 6,534,588 B1 * | 3/2003 | Locken et al. | ............... | 524/591 |
| 6,586,521 B2 | 7/2003 | Blum et al. | ............... | 524/522 |
| 2001/0056154 A1 | 12/2001 | Blum et al. | ............... | 524/522 |
| 2006/0100332 A1 | 5/2006 | Gertzmann et al. | ............... | 524/386 |
| 2006/0100348 A1 | 5/2006 | Gertzmann et al. | ............... | 524/502 |
| 2006/0293468 A1 * | 12/2006 | Rische et al. | ............... | 525/457 |

FOREIGN PATENT DOCUMENTS

| | | |
|---|---|---|
| DE | 32 09 421 C2 | 9/1991 |
| EP | 0 133 949 B1 | 7/1987 |
| EP | 0 288 763 B1 | 5/1991 |

* cited by examiner

*Primary Examiner*—Bernard Lipman
(74) *Attorney, Agent, or Firm*—Noland J. Cheung; Robert S. Klemz

(57) ABSTRACT

The present invention relates to aqueous copolymer dispersions containing

A) one or more hydroxy-functional copolymers synthesized from
  a) one or more OH-free (meth)acrylic esters and/or vinylaromatics,
  b) one or more hydroxy-functional (meth)acrylic esters,
  c) one or more ionic and/or potential ionic monomers capable of free-radical copolymerization, and
  d) one or more optionally monomers other than components a) to c) that are capable of free-radical copolymerization, and B) one or more hydroxy-functional polycarbonate polyols as reactive diluent.

The present invention also relates to a process for preparing these aqueous copolymer dispersions and to their use in coating compositions.

11 Claims, No Drawings

AQUEOUS COPOLYMER DISPERSIONS WITH REACTIVE DILUENT

BACKGROUND OF THE INVENTION

1. Field of the Invention

The present invention relates to aqueous copolymer dispersions with low solvent content and based on hydroxy-functional copolymers, to a process for preparing them, to binder compositions containing the aqueous copolymer dispersions, and to the use of the binders for preparing scratch-resistant coatings.

2. Description of Related Art

In coating systems (for example, as described in DE-A 3 209 421, EP-A 95 263, EP-A 105 293, EP-A 133 949, EP-A 288 763) it is known to use water-dilutable, copolymer-based binders. These binders, however, generally include emulsifiers for stabilizing and/or sizable fractions of organic cosolvents.

The use of sizable amounts of organic solvents is undesirable on environmental grounds. It is, however, unavoidable in pursuit of the aim, during polymer preparation, of ensuring adequate stirrability and heat removal of the reaction mixture and a certain minimum fill level of the reactor. In aqueous coating compositions, additionally, organic solvents lead to advantageous effects such as improved storage stability, pigment wetting film optical qualities, and levelling.

Subsequent reduction of process-related solvent content from copolymers or copolymer dispersions entails a high level of expenditure in terms of apparatus and energy and, thus, also in terms of costs, so that there is a need for aqueous polymer dispersions that can be prepared largely without the use of organic solvents without any deterioration in performance properties.

Copolymer dispersions which are cured by means of a chemical reaction, for example with an amino resin or with a blocked or non-blocked polyisocyanate, must contain a certain amount of reactive groups, such as hydroxyl groups. These groups are introduced into the copolymer generally through the use of hydroxy-functional (meth)acrylic esters during the copolymerization. In comparison to the non-functional (meth)acrylic esters or to styrene, however, these hydroxy-functional raw materials are very expensive. Also, it is frequently necessary to use sizable amounts of these raw materials in comparison to copolymers in organic solution, in order to compensate the hydrophilicity of the coating films by means of a greater crosslinking density.

One method for the preparation of hydroxy-functional secondary copolymer dispersions that largely avoids the use of solvents for the polymerization is disclosed in EP-A 0 758 007. The solvents typically employed are fully or partly replaced therein by hydroxy-functional polyethers. The hydroxy-functional polyethers remain, as reactive diluents, in the secondary dispersion and are included in the subsequent crosslinking reaction with blocked or non-blocked isocyanates, forming urethane. Consequently they do not contribute to the VOC. It has become known, however, that in certain fields of application polyether fractions in the coating compositions lead to low resistance properties, for example to a low scratch resistance.

It has now been found that aqueous copolymer dispersions with a low solvent content and a high resistance level on the part of the coating films, particularly very good scratch resistance and acid resistance, can be based on hydroxy-functional copolymers if hydroxy-functional polycarbonates are used as reactive diluents.

SUMMARY OF THE INVENTION

The present invention relates to aqueous copolymer dispersions containing

A) one or more hydroxy-functional copolymers synthesized from
 a) one or more OH-free (meth)acrylic esters and/or vinylaromatics,
 b) one or more hydroxy-functional (meth)acrylic esters,
 c) one or more ionic and/or potential ionic monomers capable of free-radical copolymerization, and
 d) one or more optionally monomers other than components a) to c) that are capable of free-radical copolymerization, and B) one or more hydroxy-functional polycarbonate polyols as reactive diluent.

The present invention also relates to a process for preparing the copolymer dispersions of the present invention by free radically polymerizing one or more monomer mixtures containing a) one or more OH-free (meth)acrylic esters and/or vinylaromatics,
b) one or more hydroxy-functional (meth)acrylic esters,
c) one or more ionic and/or potential ionic monomers capable of free-radical copolymerization, and
d) one or more optionally monomers other than components a) to c) that are capable of free-radical copolymerization in the presence of one or more hydroxy-functional polycarbonate polyols as reactive diluent B) and subsequently dispersing the resulting copolymers in water, before or after the addition of a neutralizing agent.

The present invention further relates to coating compositions containing the aqueous copolymer dispersions of the invention and to scratch-resistant coatings prepared from these coating compositions.

DETAILED DESCRIPTION OF THE INVENTION

Monomers of component a) that are used are acrylates and methacrylates (referred to below as (meth)acrylates) having 1 to 18 carbon atoms in the alcohol moiety of the ester group. This alcohol moiety may be linear aliphatic, branched aliphatic or cycloaliphatic.

Suitable monomers a) include methyl, ethyl, n-propyl, n-butyl, isopropyl, isobutyl, t-butyl, the isomeric pentyls, hexyls, 2-ethylhexyls, octyls, dodecyls, hexadecyls, octadecyls or cyclohexyls, trimethylcyclohexyl, and isobornyl (meth)acrylates or acetoacetoxyethyl methacrylate. Suitable vinyl aromatics include, in particular, styrene, substituted styrenes, and vinyltoluenes. Also suitable as component a) are mixtures of the preceding compounds.

Suitable as component b) are ethylenically unsaturated, OH-containing monomers, such as hydroxyalkyl esters of unsaturated carboxylic acids, preferably hydroxyalkyl (meth)acrylates having 2 to 12, preferably 2 to 6, carbon atoms in the hyroxyalkyl radical. Examples include 2-hydroxyethyl (meth)acrylate, the isomeric hydroxypropyl(meth)acrylates, 2-, 3-, and 4-hydroxybutyl(meth)acrylates, and the isomeric hydroxyhexyl(meth)acrylates.

Ionic and/or potential ionic monomers c) are these capable of free-radical polymerization and include olefinically unsaturated monomers having carboxylic acid or carboxylic anhydride groups. Examples include acrylic acid, methacrylic acid, β-carboxyethyl acrylate, crotonic acid, fumaric acid, maleic anhydride, itaconic acid or monoalkyl esters of dibasic acids and/or anhydrides such as monoalkyl maleates, preference being given to acrylic acid and/or methacrylic acid.

Other suitable monomers c) are unsaturated, free-radically polymerizable compounds having phosphate, phosphonate, sulphonic acid or sulphonate groups, as described for example in WO-A 00/39181 (p. 8, l. 13-p. 9, l. 19), preference being given to 2-acrylamido-2-methylpropanesulphonic acid.

It is also possible to use other monomers capable of free-radical copolymerization as component d). Examples include derivatives of acrylic or methacrylic acid such as acylamide, methacrylamide, acrylonitrile, and methacrylonitrile; vinyl ethers; and vinyl acetates. Other suitable monomers d) include (meth)acrylate monomers and/or vinyl monomers having a functionality of two or more, such as hexanediol di(meth)acrylate or divinylbenzene. Also suitable as monomers d) are polymerizable hydroxy-functional monomers, modified with alkylene oxides or chain-extended and having a number average molecular weight $\leq$3000 g/mol, preferably $\leq$500 g/mol. Alkylene oxides employed for this purpose are preferably ethylene, propylene or butylene oxide, and may be sued individually or in mixtures.

Other monomers d) include vinyl esters, for example, of the Versatic acids, which are available commercially under the name VEOVA™ 9, 10, and 11 (from Resolution Performance Products). They are vinyl esters having a highly branched structure of formula (I)

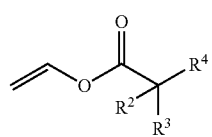

(I)

wherein $R^2$ and $R^3$ are branched alkyl groups containing together 6, 7 or 8 carbon atoms and $R^4$ is methyl. These acids correspond to VEOVA™ 9, 10, and 11 acids.

The glass transition temperatures (Tg) of the homopolymers of the VEOVA series are reported to be 70° C. (VEOVA 9), −3° C. (VEOVA 10), and −40° C. (VEOVA 11).

Other monomers d) include alkoxypolyethylene glycol or alkoxypropylene glycol (meth)acrylic esters, such as those obtained by esterification of acrylic or methacrylic with ethylene oxide polyethers or propylene oxide polyethers prepared starting from monofunctional alcohols such as methanol, ethanol, (iso)propanol or one of the isomers of butanol. Preference is given to alkoxypolyethylene glycol (meth)acrylic acid esters.

Suitable hydroxy-functional polycarbonate polyols B) are preferably those prepared by reacting monomeric diols (such as 1,4-butanediol, 1,6-hexanediol, di-, tri- or tetraethylene glycol, di-, tri- or tetrapropylene glycol, 3-methyl-1,5-pentanediol, 4,4'-dimethylolcyclohexane and/or mixtures thereof) with diaryl carbonates (such as diphenyl carbonate, dialkyl carbonates (such as dimethyl carbonate and diethyl carbonate), alkylene carbonates (such as ethylene carbonate or propylene carbonate), or phosgene. Optionally, a minor amount of higher functional, monomeric polyols, such as trimethylolpropane, glycerol or pentaerythritol, may be used.

The hydroxy-functional polycarbonate polyols B) have an average hydroxyl functionality of 1.6 to 6, preferably 1.8 to 3 and more preferably 1.9 to 2.3, and a number average molecular weight of 240 to 5000, preferably of 500 to 3000, and more preferably of 700 to 1500. Polycarbonate polyols B) are preferably prepared by the preparation method described in EP 1 404 740 B1 (pp. 6-8, Examples 1-6) and EP 1 477 508 A1 (p. 5, Example 3).

Particularly preferred polycarbonate polyols B) are prepared from 1,4-butanediol, 1,6-hexanediol, 3-methyl-1,5-pentanediol or mixtures of two of the preceding diols and have an average hydroxyl functionality of 1.9 to 2.05.

The amount of component B), based on the weight of components A) and B), is customarily 5% to 60% by weight, preferably 10% to 40% by weight and more preferably 15% to 30% by weight.

The procedure for the polymerization of the unsaturated monomers is known and involves introducing reactive diluent B) into a reaction vessel, as an initial charge, and polymerizing the unsaturated monomers using a free-radical initiator. The copolymerization is preferably carried out in general at 40 to 200° C., more preferably at 60 to 180° C., and most preferably at 80 to 160° C.

Optionally, it is possible for organic solvents to be employed in minor amounts. Suitable solvents include those known from coatings technology, such as alcohols, ethers, alcohols containing ether groups, esters, ketones, apolar hydrocarbons, or mixtures of these solvents. The solvents are used in amounts such that their amount in the finished dispersion is 0 to 5% by weight. If necessary, the solvents used can be partially removed again by distillation.

Examples of suitable initiators for the polymerization reaction include organic peroxides (such as di-tert-butyl peroxide or tert-butyl peroxy-2-ethylhexanoate) and azo compounds (such as azodiisobutyronitrile (AIBN)). The amounts of initiator used depend on the desired molecular weight. For reasons of operational reliability and greater ease of handling it is also possible to use peroxide initiators as a solution in suitable organic solvents of the type mentioned above.

In one preferred embodiment of the process there is a two-stage addition and polymerization of unsaturated monomers in the presence of component B). In this embodiment in a first step (I) a hydroxy-functional copolymer having an OH number of 12 to 200, preferably 15 to 190, and more preferably 100 to 165 mg KOH/g solids and an acid number of 0 to 50, preferably 0 to 20, and more preferably 0 to 15 mg KOH/g solids is prepared from 55 to 90% by weight of component a), 2.5 to 50% by weight of component b), 0 to 6.5% by weight of component c), and 0 to 42.5% by weight of component d).

In a subsequent step (II) another polymer is prepared in the reaction mixture obtained from step (I) from monomers a)-d). This polymer has an OH number of 20 to 200, preferably 20 to 190, and more preferably 50 to 165 mg KOH/g solids and an acid number of 50 to 200, preferably 75 to 185, and more preferably 77 to 150 mg KOH/g solids. The polymer from step (II) is prepared from 45% to 80% by weight of component a), 5% to 50% by weight of component b), 6.5 to 25% by weight of component c) and 0 to 43.5% by weight of component d).

In both steps the % data of the polymer compositions add up to 100% by weight per polymer. The monomer amounts of the two polymer preparations are chosen such that the weight ratio of the polymer from step (I) to the polymer from step (II) amounts to 10:1 to 1:2, preferably 6:1 to 2:1.

The amounts of synthesis components a) to d) are preferably selected such that the copolymer has an OH number of 12.5 to 200 mg KOH/g, preferably of 15 to 190 mg KOH/g and more preferably of 95 to 165 mg KOH/g solids and an acid number of 4.5 to 150 mg KOH/g, preferably 7 to 75 mg KOH/g, and more preferably of 10 to 60 mg KOH/g solids. The resulting polymer from steps (I) and (II) is prepared from 54% to 83% by weight, preferably 53.5% to 87% by weight, of component a); 2.5% to 50% by weight, preferably 3% to 50% by weight, of component b); 0.6% to 19%, preferably 1% to 12.5% by weight, of component c); and 0 to 43.5%, preferably 0 to 43% by weight, of component d).

Instead of a multistage polymerization process it is possible to carry out the operation continuously (gradient polymerization) by adding a monomer mixture with a composition which changes in accordance with the composition of the copolymer or copolymers A). The hydrophilic monomer fractions of components c) and optionally d) are preferably higher towards the end of the feed than at the beginning.

The copolymers obtainable by the process of the invention have number average molecular weights, $M_n$, of 500 to 30,000 g/mol, preferably 1000 to 15,000 g/mol, and more preferably 1500 to 10,000 g/mol.

Before, during or after dispersing hydroxy-functional copolymers A) in water at least a portion of the acid groups present are converted into their salt form by adding suitable neutralizing agents. Suitable neutralizing agents include organic amines or water-soluble inorganic bases, such as soluble metal hydroxides, metal carbonates or metal hydrogencarbonates.

Examples of suitable amines include N-methylmorpholine, triethylamine, ethyldiisopropylamine, N,N-dimethylethanolamine, N,N-dimethylisopropanolamine, N-methyldiethanolamine, diethylethanolamine, triethanolamine, butanolamine, morpholine, 2-aminomethyl-2-methylpropanol or isophorone diamine. In mixtures it is also possible, proportionally, to use ammonia. Particular preference is given to triethanolamine, N,N-dimethylethanolamine and ethyldiisopropylamine.

The neutralizing agents are added in amounts such that there is a theoretical degree of neutralization of the acid groups of 40% to 150%, preferably 60% to 120%. The degree of neutralization is understood to be the ratio between the added basic groups of the neutralizing component and the acid functions of the copolymer. The pH of the aqueous binder dispersion of the invention is 6 to 10, preferably 6.5 to 9.

The aqueous copolymer dispersions of the invention have a solids content of 25% to 70% by weight, preferably 35% to 60% by weight, and more preferably of 40% to 55% by weight, and an organic solvent content of 0 to 5% by weight, preferably 0.5% to 3.5% by weight.

The copolymer dispersions of the invention can be used to prepare aqueous coating compositions. By combining them with crosslinkers it is possible, depending on reactivity or optionally blocking the crosslinkers, to produce both one-component and two-component coating compositions. One-component coating composition for the purposes of the present invention are coating compositions in which the binder component and crosslinker component can be stored together without a crosslinking reaction taking place to any significant extent or any extent detrimental to the subsequent application. The crosslinking reaction takes place only during or after application, following activation of the crosslinker. This activation may be brought about, for example, by raising the temperature.

Two-component coating composition for the purposes of the present invention are coating compositions in which the binder component and crosslinker component, due to their high reactivity, have to be stored in separate vessels. The two components are only mixed shortly before application, where they react generally without additional activation. To accelerate the crosslinking reaction, it is also possible to use catalysts or to employ higher temperatures.

The present invention also relates to aqueous coating compositions containing
i) one or more aqueous copolymer dispersions of the invention and
ii) at least one OH-reactive crosslinker.

Examples of suitable OH-reactive crosslinkers include polyisocyanate crosslinkers, amide- and amine-formaldehyde resins, phenolic resins, aldehyde resins and ketone resins, such as phenol-formaldehyde resins, resols, furan resins, urea resins, carbamic ester resins, triazine resins, melamine resins, benzoguanamine resins, cyanamide resins and aniline resins.

Preferred crosslinkers are polyisocyanates having 2 or more isocyanate groups per molecule and prepared, for example, from isophorone diisocyanate, hexamethylene diisocyanate, 1,4-diisocyanatocyclohexane, bis(4-isocyanatocyclohexane)methane, 1,3-diisocyanatobenzene, triisocyanatononane or the isomeric tolylene 2,4- and 2,6-diisocyantes (TDI). The polyisocyanates may additionally contain urethane, isocyanurate and/or biuret groups. The polyisocyanates may optionally be blocked.

Particular preference is given to using low viscosity polyisocyanates prepared from aliphatic or cycloaliphatic isocyanates. Optionally these polyisocyanates may also be hydrophilic.

The polyisocyanates used as crosslinkers preferably have a viscosity at 23° C. of 10 to 5000 mPa·s and, for the purpose of viscosity adjustment, may be employed as a blend with small amounts of inert solvents.

The copolymers of the invention are generally sufficiently hydrophilic that even hydrophobic crosslinker resins can be dispersed without additional emulsifiers. This does not, however, rule out the use of external emulsifiers.

Water-soluble or dispersible polyisocyanates are obtained, for example, by modification with carboxylate, sulfonate and/or polyethylene oxide groups and/or polyethylene oxide/polypropylene oxide groups. The hydrophilic modification of the polyisocyanates may be carried out, for example, by reaction with substoichiometric amounts of monohydric, hydrophilic polyether alcohols. The preparation of hydrophilic polyisocyanates of this type is described for example in EP-A 0 540 985 (p. 3, l.55 to p. 4, l.5).

Also highly suitable are the polyisocyanates described in EP-A 959 087 (p. 3, ll. 39 to 51) which contain allophanate groups and are prepared by reacting low-monomer-content polyisocyanates with polyethylene oxide polyether alcohols under allophanatization conditions. Also suitable are the water-dispersible polyisocyanate mixtures described in DE-A 100 078 21 (p. 2, l. 66 to p. 3, l. 5), which are prepared from triisocyanatononane, and the hydrophilic polyisocyanates containing ionic groups (sulfonate groups, phosphonate groups), as described for example in DE-A 100 24 624 (p. 3, ll. 13 to 33).

It is also possible to use of mixtures of different crosslinker resins.

Before, during or after the preparation of the aqueous copolymer dispersions of the invention it is possible to add the known additives from coatings technology, such as defoamers, thickeners, pigments, dispersing assistants, catalysts, anti-skinning agents, anti-settling agents or emulsifiers. These additives may also be added to the coating composition containing the aqueous copolymer dispersions of the invention.

Aqueous coating compositions containing the aqueous copolymer dispersions of the invention are suitable for all fields of use that require aqueous coating compositions to meet exacting requirements in terms of film stability, for example. The compositions may be used for coating the surfaces of mineral building materials, the coating and sealing of wood and wood-based materials, the coating of metallic surfaces (metal coating), the coating and varnishing of asphaltic or bituminous surfacings, the coating and sealing of various plastics surfaces (plastics coating), and high-gloss varnishes.

The aqueous coating compositions containing the aqueous copolymer dispersions of the invention are suitable for producing low-solvent primers, surfacers, pigmented or transparent topcoat materials, clearcoat materials and high-gloss varnishes, and also single-coat materials applied both singly and serially, in the field, for example, of industrial coating or automotive OEM finishing or refinish. The aqueous copolymer dispersions of the invention are particularly suitable for producing aqueous clearcoat materials for automotive OEM finishing, where particularly high resistance properties, such as scratch resistance and chemical resistance, are required.

The present invention also relates to a process for producing coatings wherein a coating composition containing the copolymer dispersions of the invention is applied to a substrate and subsequently cured. The resulting coatings generally have a residual gloss after reflow of more than 90%.

The coating compositions of the invention are cured typically at temperatures of 0 to 180° C., preferably 18 to 160° C., and more preferably of 40 to 140° C.

The coatings can be produced by a variety of spraying methods, such as compressed-air spraying, airless spraying or electrostatic spraying methods, using one-component or, optionally, two-component spray equipment. The coating composition and coating compositions comprising the aqueous, hydroxy-functional copolymer dispersions of the invention can also be applied by other methods such as spreading, rolling or knifecoating.

EXAMPLES

Unless indicated otherwise, all percentages are by weight.

Viscosity measurements were carried out using a Physica Viscolab® LC3 ISO cone/plate viscometer from Physica, Stuttgart, Germany in accordance with DIN 53019, with a shear rate of 40 s$^{-1}$.

The average particle size was determined by means of laser correlation spectroscopy (Zetasizer® 1000, Malvern Instruments, Herrenberg, Germany).

The reported OH numbers were calculated based on the monomers employed.

Acid numbers: determination method—DIN ISO 3682

Example 1

A 4-Liter, multi-necked flask equipped with stirrer mechanism was charged with 469 g of 1,6-hexanediol and 454 g of ε-caprolactone, plus 0.2 g of titanium tetraisopropoxide, and this initial charge was heated to 110° C. by means of an oil bath under a stream of inert gas (nitrogen). 401 g of dimethyl carbonate were added to the reaction mixture over 15 minutes by means of a pump, after which the mixture was held under reflux for a further 24 hours. Then a mixture of dimethyl carbonate and methanol was removed from the reaction mixture under atmospheric pressure via a distillation column, the oil bath temperature being raised continuously over 7 hours from 110° C. to 150° C. This was followed by a reduction in the oil bath temperature to 100° C. and in the pressure to 20 mbar (absolute), accompanied by removal of methanol and residual dimethyl carbonate. Subsequently the oil bath temperature was increased to 180° C. over 5 hours, and held at this temperature for 2 hours. The reaction mixture was subsequently cooled to room temperature and 0.2 g of dibutyl phosphate was added. The resulting polycarbonate ester diol had a hydroxyl number of 113 mg KOH/g.

Example 2

Example 1 was repeated except that 861 g of 1,6-hexanediol and 0.2 g of ytterbium(III) acetylacetonate were introduced as the initial charge and 826 g of dimethyl carbonate were pumped in. The addition of 0.2 g of dibutyl phosphate, as in Example 1, was omitted. The resulting polycarbonate diol had a hydroxyl number of 109 mg KOH/g.

Example 3

Example 1 was repeated except that 616 g of 1,6-hexanediol, 1408 g of 1,4-butanediol and 0.2 g of ytterbium(III) acetylacetonate were introduced as the initial charge and 2477 g of dimethyl carbonate were pumped in. The addition of 0.2 g of dibutyl phosphate, as in Example 1, was omitted. The resulting polycarbonate diol had a hydroxyl number of 113 g KOH/g.

Example 4

Into a 60-liter pressure reactor equipped with top mounted distillation attachment, stirrer and receiver was charged with 34,092 g of 3-methyl-1,5-pentanediol, 8.0 g of ytterbium(III) acetylacetonate and 10,223 g of dimethyl carbonate at 80° C. The reaction mixture was subsequently heated to 150° C. in 2 h, under a nitrogen atmosphere, where it was held for 2 h with stirring and under reflux, the pressure rising to 3.9 bar (absolute). Then the methanol elimination product was removed as a mixture with dimethyl carbonate by distillation, the pressure being lowered continuously over the course of 4 h by a total of 2.2 bar. Subsequently the distillation procedure was ended and a further 10,223 g of dimethyl carbonate were pumped into the reaction mixture at 150° C., at which temperature the reaction mixture was held for 2 h with stirring and under reflux, the pressure rising to 3.9 bar (absolute). Subsequently the methanol elimination product was again removed in admixture with dimethyl carbonate by distillation, the pressure being lowered continuously over the course of 4 h by a total of 2.2 bar. Subsequently the distillation operation was ended and a further 7147 g of dimethyl carbonate were pumped into the reaction mixture at 150° C., at which temperature the reaction mixture was held for 2 h, with stirring and under reflux, the pressure rising to 3.5 bar (absolute). Then, once again, the methanol elimination product was removed in admixture with dimethyl carbonate by distillation, the pressure being lowered over the course of 4 h to atmospheric pressure. After that, the reaction mixture was heated to 180° C. over the course of 2 h and was held at that temperature for 2 h with stirring. Subsequently the temperature was reduced to 130° C. and a stream of nitrogen (5 l/h) was passed through the reaction mixture, during which the pressure was lowered to 20 mbar. The temperature was subsequently increased to 180° C. over 4 h and held there for 6 h. This was followed by the further removal of methanol in admixture with dimethyl carbonate from the reaction mixture.

Aeration and cooling of the reaction batch to room temperature gave a colorless, liquid oligocarbonate diol having the following properties:

| | |
|---|---|
| Molecular weight, $M_n$ | 675 g/mol |
| OH number | 166.0 mg KOH/g |
| Viscosity | 6940 mPa·s at 23° C. and D:16. |

Example 5

A 10-liter reaction vessel equipped with stirring, cooling and heating apparatus was charged with 600 g of the polycarbonate diol from Example 1 and this initial charge was heated to 143° C. At that temperature a solution of 7.75 g of di-tert-butyl peroxide in 7.75 g of Dowanol® PnB (propylene glycol mono n-butyl ether; solvent, Dow Europe S.A., Horgen/Switzerland) was added dropwise over the course of 20 minutes. Subsequently a monomer mixture containing 81.5 g of 2-ethylhexyl acrylate, 566.5 g of hydroxyethyl methacrylate, 435 g of butyl methacrylate, 567.5 g of isobornyl methacrylate and 135 g of styrene, and, simultaneously therewith, a solution of 27.75 g of di-tert-butyl peroxide in 34.25 g of Dowanol® PnB (propylene glycol mono n-butyl ether; solvent, Dow Europe S.A., Horgen/Switzerland) were metered in at a uniform rate over the course of 4.5 hours. The temperature was maintained for approximately 20 minutes. Subsequently a monomer mixture containing 122.5 g of methyl methacrylate, 172.75 g of hydroxyethyl methacrylate, 96 g of butyl acrylate and 46.25 g of acrylic acid and, simultaneously therewith, a solution of 7.75 g of di-tert-butyl peroxide in 25 g of Dowanol® PnB (propylene glycol mono n-butyl ether; solvent, Dow Europe S.A., Horgen/Switzerland) were metered in at a uniform rate over the course of 1.5 hours. This was followed by stirring at 143° C. for one hour, then by cooling to 100° C. and the addition of 29.25 g of N,N-dimethyethanolamine. After 30 minutes of homogenization the batch was dispersed with 3400 g of water over the course of 2 hours at 80° C. The resulting copolymer dispersion had the following properties:

| | |
|---|---|
| OH content (solids, calculated theoretically) | 4.3% |
| Acid number (solids) | 14 mg KOH/g |
| Solids content | 45.0% |
| Viscosity | 850 mPa·s/23° C. |
| pH (10% in water) | 8.5 |
| Degree of neutralization | 105% |
| Average particle size | 105 nm |
| Cosolvent | 1.1% by weight |

Example 6

A 10-liter reaction vessel equipped with stirring, cooling and heating apparatus was charged with 600 g of the polycarbonate diol from Example 2 and this initial charge was heated to 143° C. At that temperature a solution of 7.75 g of di-tert-butyl peroxide in 7.75 g of Dowanol® PnB (propylene glycol mono n-butyl ether; solvent, Dow Europe S.A., Horgen/Switzerland) was added dropwise over the course of 20 minutes. Subsequently a monomer mixture containing 81.5 g of 2-ethylhexyl acrylate, 566.5 g of hydroxyethyl methacrylate, 435 g of butyl methacrylate, 567.5 g of isobornyl methacrylate and 135 g of styrene, and, simultaneously, a solution of 27.75 g of di-tert-butyl peroxide in 34.25 g of Dowanol® PnB (propylene glycol mono n-butyl ether; solvent, Dow Europe S.A., Horgen/Switzerland) were metered in at a uniform rate over the course of 4.5 hours. The reaction mixture was maintained at this temperature for approximately 20 minutes. Subsequently a monomer mixture containing 122.5 g of methyl methacrylate, 172.75 g of hydroxyethyl methacrylate, 96 g of butyl acrylate and 46.25 g of acrylic acid and, simultaneously therewith, a solution of 7.75 g of di-tert-butyl peroxide in 25 g of Dowanol® PnB (propylene glycol mono n-butyl ether; solvent, Dow Europe S.A., Horgen/Switzerland) were metered in at a uniform rate over the course of 1.5 hours. This was followed by stirring at 143° C. for one hour, then by cooling to 100° C. and the addition of 29.25 g of N,N-dimethyethanolamine. After 30 minutes of homogenization the batch was dispersed with 3625 g of water over the course of 2 hours at 80° C. The resulting copolymer dispersion had the following properties:

| | |
|---|---|
| OH content (solids; calculated theoretically) | 4.3% |
| Acid number (solids) | 15 mg KOH/g |
| Solids content | 43.5% |
| Viscosity | 400 mPa·s/23° C. |
| pH (10% in water) | 8.5 |
| Degree of neutralization | 105% |
| Average particle size | 110 nm |
| Cosolvent | 1.0% by weight |

Example 7

A 6-liter reaction vessel equipped with stirring, cooling and heating apparatus was charged with 600 g of the polycarbonate diol from Example 3 and this initial charge was heated to 143° C. At that temperature a solution of 7.75 g of di-tert-butyl peroxide in 7.75 g of Dowanol® PnB (propylene glycol mono n-butyl ether; solvent, Dow Europe S.A., Horgen/Switzerland) was added dropwise over the course of 20 minutes. Subsequently a monomer mixture containing 81.5 g of 2-ethylhexyl acrylate, 566.5 g of hydroxyethyl methacrylate, 435 g of butyl methacrylate, 567.5 g of isobornyl methacrylate and 135 g of styrene, and, simultaneously therewith, a solution of 27.75 g of di-tert-butyl peroxide in 34.25 g of Dowanol® PnB (propylene glycol mono n-butyl ether; solvent, Dow Europe S.A., Horgen/Switzerland) were metered in at a uniform rate over the course of 4.5 hours. The reaction mixture was maintained at this temperature for approximately 20 minutes. Subsequently a monomer mixture containing 122.5 g of methyl methacrylate, 172.75 g of hydroxyethyl methacrylate, 96 g of butyl acrylate and 46.25 g of acrylic acid and, simultaneously therewith, a solution of 7.75 g of di-tert-butyl peroxide in 25 g of Dowanol® PnB (propylene glycol mono n-butyl ether; solvent, Dow Europe S.A., Horgen/Switzerland) were metered in at a uniform rate over the course of 1.5 hours. This was followed by stirring at 143° C. for one hour, then by cooling to 100° C. and the addition of 29.25 g of N,N-dimethyethanolamine. After 30 minutes of homogenization the batch was dispersed with 3625 g of water over the course of 2 hours at 80° C. The resulting copolymer dispersion had the following properties:

| | |
|---|---|
| OH content (solids; calculated theoretically) | 4.3% |
| Acid number (solids) | 14 mg KOH/g |
| Solids content | 43.5% |
| Viscosity | 2360 mPa·s/23° C. |
| pH (10% in water) | 8.5 |
| Degree of neutralization | 105% |
| Average particle size | 130 nm |
| Cosolvent | 1.1% by weight |

Example 8

A 6-liter reaction vessel equipped with stirring, cooling and heating apparatus was charged with 600 g of the polycarbonate diol from Example 4 and this initial charge was heated to 143° C. At that temperature a solution of 7.75 g of di-tert-butyl peroxide in 7.75 g of Dowanol® PnB (propylene glycol mono n-butyl ether; solvent, Dow Europe S.A., Horgen/Switzerland) was added dropwise over the course of 20 minutes. Subsequently a monomer mixture containing 595.25 g of hydroxyethyl methacrylate, 487.75 g of butyl methacrylate, 692.5 g of isobornyl methacrylate and 135 g of styrene, and, simultaneously therewith, a solution of 27.75 g of di-tert-butyl peroxide in 34.25 g of Dowanol® PnB (propylene glycol mono n-butyl ether; solvent, Dow Europe S.A., Horgen/Switzerland) were metered in at a uniform rate over the course of 4.5 hours. The reaction mixture was maintained at this temperature for approximately 20 minutes. Subsequently a monomer mixture containing 102.5 g of methyl methacrylate, 173 g of hydroxyethyl methacrylate, 96 g of butyl acrylate and 75 g of acrylic acid and, simultaneously therewith, a solution of 7.75 g of di-tert-butyl peroxide in 25 g of Dowanol® PnB (propylene glycol mono n-butyl ether; solvent, Dow Europe S.A., Horgen/Switzerland) were metered in at a uniform rate over the course of 1.5 hours. This was followed by stirring at 143° C. for one hour, then by cooling to 100° C. and the addition of 97 g of N,N-dimethyethanolamine. After 30 minutes of homogenization the batch was dispersed with 3500 g of water over the course of 2 hours at 80° C. The resulting copolymer dispersion had the following properties:

| | |
|---|---|
| OH content (solids; calculated theoretically) | 4.4% |
| Acid number (solids) | 21 mg KOH/g |
| Solids content | 44.5% |
| Viscosity | 1060 mPa · s/23° C. |
| pH (10% in water) | 8.5 |
| Degree of neutralization | 105% |
| Average particle size | 94 nm |
| Cosolvent | 1.0% by weight |

Example 9

Comparative (EP-A 0 758 007, Example 1)

A 6-liter reaction vessel equipped with stirring, cooling and heating apparatus was charged with 116 g of butyl glycol and 150 g of Desmophen® V218 (polyether based on propylene oxide and glycerol, OH number 245 mg KOH/g, Bayer AG Leverkusen, DE) and this initial charge was heated to 155° C. At that temperature 321 g of butyl acrylate, 366 g of styrene and 198 g of hydroxyethyl methacrylate and, simultaneously therewith, a solution of 17.1 g if di-tert-butyl peroxide in 28.6 g of butyl glycol were metered in over the course of 2 hours. Subsequently a monomer mixture containing 83 g of hydroxyethyl methacrylate, 180 g of butyl acrylate, 139 g of styrene and 34 g of acrylic acid was metered in and, simultaneously therewith, 12.9 g of di-tert-butyl peroxide in 21.4 g of butyl glycol over the course of 1 hour. The batch was subsequently stirred at 150 to 155° C. for 2 hours, followed by cooling to 100° C. and the addition of 50 g of dimethyethanolamine. After 30 minutes of homogenization, dispersion was carried out with 1980 g of water at 80° C. over the course of 2 hours. The resulting copolymer dispersion had the following properties:

| | |
|---|---|
| OH content (solids; calculated theoretically) | 3.2% |
| Acid number (solids) | 18 mg KOH/g |
| Solids content | 40% |
| Viscosity | 830 mPa · s/23° C. |
| pH (10% in water) | 9.4 |
| Degree of neutralization | 100% |
| Average particle size | 51 nm |
| Cosolvent | 4.0% by weight |

Example 10

Comparative (EP 947 557 Example 3)

A 6-liter reaction vessel equipped with stirring, cooling and heating apparatus was charged with 186 g of butyl glycol and 186 g of solvent naphtha and this initial charge was heated to 145° C. At that temperature a mixture 1) of 750 g of methyl methacrylate, 125 g of styrene, 445 g of hydroxyethyl methacrylate, 538 g of butyl acrylate and 87 g of butyl methacrylate was metered in over 3 hours, followed immediately by a mixture 2) of 128 g of methyl methacrylate, 180 g of hydroxyethyl methacrylate, 100 g of butyl acrylate and 60 g of acrylic acid in 1.5 hours. Simultaneously therewith, over the course of 5 hours, a solution of 88 g of di-tert-butyl peroxide in 70 g of a 1:1 mixture of butyl glycol and solvent naphtha was metered in. This was followed by stirring at 145° C. for 2 hours, then by cooling to 100° C. and the addition of 76 g of N,N-dimethyethanolamine. After 30 minutes of homogenization, dispersion was carried out with 2700 g of water at 80° C. over the course of 2 hours. The resulting copolymer dispersion had the following properties:

| | |
|---|---|
| OH content (solids; calculated theoretically) | 3.3% |
| Acid number (solids) | 18 mg KOH/g |
| Solids content | 43.8% |
| Viscosity | 1400 mPa · s/23° C. |
| pH (10% in water) | 8.1 |
| Degree of neutralization | 105% |
| Average particle size | 110 nm |
| Cosolvent | 7.7% by weight |

Example 11

Polyisocyanate crosslinker

A 6-liter reaction vessel equipped with stirring, cooling and heating apparatus was charged in succession with 3500 g of Bayhydrol® XP 2570 (hydrophilic, aliphatic, polyisocyanate, based on hexamethylene diisocyanate, Bayer AG, Leverkusen) and 1500 g of Desmodur® XP 2410 (low-viscosity, aliphatic, polyisocyanate resin, based on hexamethylene diisocyanate, Bayer AG, Leverkusen) and this initial charge was homogenized at 30° C. for 60 minutes. Then 37 g of Tinuvin® 384-2 (Ciba, Basle) and 24 g of Tinuvin® 292 (Ciba, Basle) were added, followed by homogenization for a further 30 minutes. The resulting hydrophilic polyisocyanate mixture had an isocyanate content of 20.1%.

Use Example 12

Component A was mixed with the additive Byk® 347 (silicone surfactant to improve substrate wetting, Byk Chem., Wesel/Germany) in the stated amount and diluted with water.

Component B was dispersed prior to application in component A by means of a nozzle jet disperser in accordance with EP-A-0 685 544 having a hole nozzle 0.4 mm in size, at 50 bar. The mixed 2K [two-component] aqueous clearcoat material was applied with a spray gun to an aluminium panel (scratch resistances and to a steel panel (chemical resistance) which had been precoated with an aqueous surfacer coat and with a black aqueous basecoat known for automotive OEM finishing. Following application, the panels were flashed off at room temperature for 5 minutes and at 80° C. for 10 minutes, then dried at 130° C. for 30 minutes. The dry film thickness of the clearcoat was approximately 40 μm.

TABLE 1

Example 12

| | a Parts by weight | b Parts by weight | c Parts by weight | d Parts by weight | E Parts by weight |
|---|---|---|---|---|---|
| Component A | | | | | |
| Example 10 (Comparative) | 411.9 | | | | |
| Example 9 (Comparative) | | | | | 339.9 |
| Example 5 | | 356.4 | | | |
| Example 6 | | | 372.1 | | |
| Example 7 | | | | 370.4 | |
| Byk ® 347 | 2.3 | 2.2 | 2.2 | 2.2 | 2.3 |
| Water | 64.4 | 114.0 | 98.3 | 100.0 | 114.9 |
| Component B | | | | | |
| Example 11 | 119.5 | 125.6 | 125.6 | 125.6 | 141.1 |

| Scratch resistance after 17 h | | | | | |
|---|---|---|---|---|---|
| | % | % | % | % | % |
| Residual gloss | 45 | 84 | 83 | 82 | 58 |
| Residual gloss after reflow | 62 | 93 | 93 | 92 | 72 |

| +TC Chem. resistance | | | | | |
|---|---|---|---|---|---|
| | ° C. | ° C. | ° C. | ° C. | ° C. |
| Distilled water | 36 | 46 | >68 | >68 | 36 |
| 1% strength NaOH | 40 | 41 | 44 | 41 | 37 |
| 1% strength $H_2SO_4$ | 38 | 37 | 38 | 39 | 36 |

Scratch Resistance

Scratch resistance testing on the clearcoats was carried out in accordance with DIN 55668.

The relative residual gloss in % indicates the level of the degree of gloss [20°] after scratching in accordance with DIN 5668 in comparison to the degree of loss before scratching. The higher this figure, the better the scratch resistance.

Chemical Resistance

The chemical resistance is reported in ° C. units. For that purpose the clearcoat coating was subjected to a trickle of distilled water or 1% strength sodium hydroxide solution or 1% strength sulphuric acid, respectively, and heated in a gradient oven. The temperature at which visible damage to the clearcoat coating occurred for the first time is measured. The higher this temperature, the more resistant the clearcoat coating.

The example shows clearly that the copolymer dispersions of the invention can be used to prepare coating compositions with substantially better scratch resistance (residual gloss after reflow >90%) and very good chemical resistance when compared to the products of the prior art.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous copolymer dispersion comprising
   A) one or more hydroxy-functional copolymers synthesized from
      a) one or more OH-free (meth)acrylic esters and/or vinylaromatics,
      b) one or more hydroxy-functional (meth)acrylic esters,
      c) one or more ionic and/or potential ionic monomers capable of free-radical copolymerization, and
      d) optionally one or more monomers other than components a) to c) that are capable of free-radical copolymerization, and
   B) one or more hydroxy-functional polycarbonate polyols having a number average molecular weight of 750 to 1500 as reactive diluent.

2. The aqueous copolymer dispersion of claim 1 wherein hydroxy-functional polycarbonate polyols B) have an average hydroxyl functionality of 1.6 to 6 and a number average molecular weight of 240 to 5000 Da.

3. The aqueous copolymer dispersion of claim 1 wherein hydroxy-functional polycarbonate polyols B) are prepared from 1,4-butanediol, 1,6-hexanediol.3-methyl-1,5-pentanediol or mixtures thereof.

4. The aqueous copolymer dispersion of claim 2 wherein hydroxy-functional polycarbonate polyols B) are prepared from 1,4-butanediol, 1,6-hexanediol. 3-methyl-1,5-pentanediol or mixtures thereof.

5. The aqueous copolymer dispersion of claim 1 wherein hydroxy-functional polycarbonate polyols B) have an average hydroxyl functionality of 1.9 to 2.05.

6. The aqueous copolymer dispersion of claim 2 wherein hydroxy-functional polycarbonate polyols B) have an average hydroxyl functionality of 1.9 to 2.05.

7. The aqueous copolymer dispersion of claim 3 wherein hydroxy-functional polycarbonate polyols B) have an average hydroxyl functionality of 1.9 to 2.05.

8. The aqueous copolymer dispersion of claim 4 wherein hydroxy-functional polycarbonate polyols B) have an average hydroxyl functionality of 1.9 to 2.05.

9. An aqueous coating composition comprising
   i) one or more of the aqueous copolymer dispersions of claim 1 and
   ii) one or more OH-reactive crosslinkers.

10. A process for producing coatings which comprises applying a coating composition comprising the copolymer dispersion of claim 1 to a substrate and subsequently curing the coating composition to form a coating.

11. A substrate coated with the coating composition of claim 1.

* * * * *